United States Patent
Rodrigues et al.

(10) Patent No.: US 11,779,030 B2
(45) Date of Patent: Oct. 10, 2023

(54) CARAMEL, CONFECTION COMPRISING THE CARAMEL AND METHOD OF MAKING THE CONFECTION

(71) Applicant: Mars, Incorporated, McLean, VA (US)

(72) Inventors: Tiago Rodrigues, McLean, VA (US); Justin Comes, Huairou (CN); Alexander Noah Suter, McLean, VA (US); Lydia Eugenia Gutierrez Mantilla, McLean, VA (US); Frank Firestone, McLean, VA (US); Lauren Popescu, McLean, VA (US); Hetvi Damodhar, McLean, VA (US); Karl Ritter, McLean, VA (US); Robert Nagle, McLean, VA (US); Keith Dixon, McLean, VA (US); Paul Capar, McLean, VA (US); Paul Reeder, Columbus, OH (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 17/493,650

(22) Filed: Oct. 4, 2021

(65) Prior Publication Data

US 2022/0095644 A1    Mar. 31, 2022

Related U.S. Application Data

(62) Division of application No. 14/150,242, filed on Jan. 8, 2014, now Pat. No. 11,134,702.
(Continued)

(51) Int. Cl.
  *A23G 3/40*   (2006.01)
  *A23G 3/54*   (2006.01)
(Continued)

(52) U.S. Cl.
  CPC .............. *A23G 3/40* (2013.01); *A23G 3/32* (2013.01); *A23G 3/42* (2013.01); *A23G 3/54* (2013.01)

(58) Field of Classification Search
  USPC .................................................. 426/660, 103
  See application file for complete search history.

(56) References Cited

U.S. PATENT DOCUMENTS

| 3,955,003 A | 5/1976 | Loos |
| 4,563,358 A | 1/1986 | Mercer |

(Continued)

FOREIGN PATENT DOCUMENTS

| CA | 2433920 | 6/2003 |
| EP | 0175160 | 8/1985 |

(Continued)

OTHER PUBLICATIONS

Mendenhall et al., "Protein Content Affects Caramel Processing and Properties," J. Food Engineering, 2016, 86:58-68.
(Continued)

*Primary Examiner* — Lien T Tran

(57) ABSTRACT

A caramel is provided comprising a solid plant fat and an amount of water less than 10 wt %. The caramel exhibits a chewy texture when consumed but is yet depositable. The caramel is thus advantageously used in a confection. In addition to the caramel, the confection may comprise a crisp component. Methods of making the confection are also provided.

19 Claims, 2 Drawing Sheets

Related U.S. Application Data

(60) Provisional application No. 61/750,374, filed on Jan. 9, 2013.

(51) Int. Cl.
*A23G 3/42* (2006.01)
*A23G 3/32* (2006.01)

(56) References Cited

U.S. PATENT DOCUMENTS

| | | |
|---|---|---|
| 4,710,393 A | 12/1987 | Holmgren |
| 4,986,475 A | 1/1991 | Spadafora et al. |
| 5,236,730 A | 8/1993 | Yamada |
| 5,384,148 A | 1/1995 | Lynch |
| 5,962,061 A | 10/1999 | Ter Braak |
| 6,616,963 B1 | 9/2003 | Zerby et al. |
| 6,673,380 B2 | 1/2004 | Yang |
| 6,953,598 B2 | 10/2005 | Cotton |
| 8,486,469 B2 | 7/2013 | Coleman et al. |
| 2001/0018083 A1 | 8/2001 | Eder |
| 2002/0192343 A1 | 12/2002 | Serpelloni |
| 2002/0197357 A1 | 12/2002 | Pfeiffer |
| 2003/0161914 A1 | 8/2003 | Sault et al. |
| 2004/0126464 A1 | 7/2004 | Zimeri |
| 2005/0037131 A1 | 2/2005 | Bosma-Denboer |
| 2005/0089618 A1 | 4/2005 | Bernard et al. |
| 2005/0118323 A1 | 6/2005 | Sault et al. |
| 2006/0286212 A1* | 12/2006 | Yu ............................ A23G 3/32 426/94 |
| 2008/0241319 A1 | 10/2008 | Pandey |
| 2009/0061069 A1 | 3/2009 | Warnecke |
| 2010/0015295 A1 | 1/2010 | Haas |
| 2010/0151095 A1 | 6/2010 | Besse |
| 2011/0262598 A1* | 10/2011 | Leadbeater .............. A23G 1/54 426/282 |
| 2014/0120208 A1 | 5/2014 | Mateus et al. |
| 2014/0193545 A1 | 7/2014 | Rodrigues et al. |

FOREIGN PATENT DOCUMENTS

| | | |
|---|---|---|
| EP | 0636001 | 8/1998 |
| EP | 0931461 | 7/1999 |
| EP | 1267628 | 11/2005 |
| EP | 1774856 | 4/2007 |
| GB | 1417797 | 12/1975 |
| GB | 2453202 | 4/2009 |
| JP | 2011045343 | 3/2011 |
| WO | WO2001072134 | 10/2001 |
| WO | WO2002039823 | 5/2002 |
| WO | WO2003068000 | 8/2003 |
| WO | WO2005089255 | 9/2005 |
| WO | WO2008142074 | 11/2008 |
| WO | WO2012152650 | 11/2012 |

OTHER PUBLICATIONS

European Examination report in EP application No. 14701643.0, dated Jun. 2, 2017, 7 pages.

* cited by examiner

CARAMEL, CONFECTION COMPRISING THE CARAMEL AND METHOD OF MAKING THE CONFECTION

CROSS-REFERENCE TO RELATED APPLICATIONS

This application is a divisional, and claims priority, of U.S. application Ser. No. 14/150,242, filed Jan. 8, 2014, now U.S. Pat. No. 11,134,702, issued Oct. 5, 2021, which claims priority of U.S. Provisional Application No. 61/750,374, filed Jan. 9, 2013. The contents of all of the prior applications are incorporated herein by reference in their entirety.

FIELD

The present invention relates to a caramel and a confection comprising the caramel and a crisp component. Methods for making the confections are also provided.

BACKGROUND

Multi-textured confections are desired by consumers for the enjoyable eating experience they provide. Yet, such confections can be difficult to manufacture. For example, if components having a variety of textures are desirably included in the confection, provision of these components as discrete layers can be required or desired so that the desired array of textures and/or flavors is maintained until the confection is consumed. Placing high moisture components directly adjacent to components that desirably exhibit a crisp texture is problematic, as moisture can have a tendency of migrating from one to the other.

The problem of moisture migration within confections has been addressed by providing a fat-based moisture barrier, typically comprising a triglyceride fat, between high moisture and crisp components. However, the application of a moisture barrier requires extra processing time and equipment. Unfortunately, even with specialized equipment and extra care, many opportunities exist for failure of the barrier layer during processing and storage, with the result being a confection that is suboptimal texturally.

Moisture barriers are particularly challenged in confections wherein the high moisture component is not completely enrobed by the barrier. In such arrangements, and although the barrier may be intact at the interface of the crisp component and high moisture component, moisture may nonetheless escape the high moisture component, and be absorbed by the crisp component, where the barrier is absent. Packaging may also act to provide an enclosed environment within which this transfer may occur.

Caramel is but one example of a material often desirably used as a component of a multi-textured confection. However, caramel is also an example of a confection in which the amount of water can not only be determinative of its taste and texture, but also, of its processability. And, while some caramel confections are desirably more fluid, e.g., ice cream toppings or certain filled confections, in other applications, caramel may desirably be chewy in texture. While the former can be messy to consume, but easy to deposit, the latter provides a cleaner consuming experience, but can be difficult to deposit. In order to address the difficulty of working with stiffer caramels, enrobing manufacturing practices are often employed. However, many of today's enrobing methodologies are extremely limited to the shapes to which they can be employed to squares and rectangles. The manufacture of complex shapes with an enrobing process, and thus, with stiffer caramels, is not efficient.

Caramel having desired taste and texture properties while yet being efficiently processable would thus be welcome in the art. A multi-textured confection comprising such a caramel would provide further advantage as would the ability to manufacture the same.

BRIEF DESCRIPTION

The present invention provides such a caramel. More particularly, there is provided a caramel comprising a solid plant fat and an amount of water less than 10%. While the inclusion of liquid fat can render caramel more processable, caramels prepared from liquid fats are often softer than desirable for some applications, and indeed may often be runny. It has now surprisingly been discovered that a caramel may be prepared using a solid plant fat that provides the chewy texture desired in some applications. Yet, the caramel is still processable, i.e., the caramel exhibits an extrusion force of from 3500-8000 gm at 35° C. The inclusion of an amount of water less than 10% also assists in providing the caramel with the desired organoleptic properties while not detrimentally impacting the processability of the caramel. Even though the caramel comprises up to 10% water, confections comprising the caramel and a crisp component do not exhibit undesirable levels of, or any, moisture migration from the caramel to the crisp component even if a moisture barrier is not included between the two. Because the textural and taste attributes of the caramel are not provided at the expense of processability, the confections are readily processed without the use of enrobing technology or equipment. As a result, complex shapes are possible.

In one aspect, a caramel is provided. The caramel comprises a solid plant fat and an amount of water less than 10 wt. %, or from 0.1 wt. % to 5 wt. %, or from 0.5 wt. % to 4 wt. % water. In some embodiments, the caramel does not comprise a liquid fat. The solid plant fat desirably has a Mettler Drop Point melting point of from 35° C. to 50° C., or from 40° C. to 45° C. In some embodiments, the solid plant fat may have an iodine value of from 35 to 50, or from 40 to 45. The solid content of the solid plant fat is from 70% to 80% at 10° C., or from 50% to 60% at 20° C., or both. In some embodiments, the solid plant fat may comprise less than 1.0 wt. % trans fat. The caramel exhibits an extrusion force of from 3500 gm to 8000 gm, or from 4000 gm to 7500 gm at 35° C.

The caramel may further comprise a corn syrup blend, e.g., from 40:60 to 60:40, of 42 DE and 63 DE corn syrup. A monosaccharide may also be used in the caramel, and in such embodiments, may be present in amounts from 2 to 5 wt. % based upon the total weight of the caramel. Any monosaccharide may be included, such as dextrose, fructose, galactose, polymeric forms of these, anhydrous forms of these, hydrates of these, or combinations of these. In embodiments wherein a monosaccharide is desirably included, the monosaccharide may be dextrose. The caramel may further include a polyol, such as sorbitol, glycerin, hydrogenated starch hydrolysates, hydrogenated isomaltose, maltitol, mannitol, xylitol, erythritol, or a combination of these. In some embodiments, the caramel may comprise glycerin. In some embodiments, the caramel may have a carbohydrate to protein ratio of from 35:1 to 45:1. The caramel may also have a protein content of from about 1.5 wt. % to about 2.5 wt. %, based upon the total weight of the caramel.

Due at least in part to the low moisture content and the properties of the solid plant fat, the caramel is readily deposited during manufacture, and yet exhibits the desired organoleptic properties upon consumption. And so, in another aspect, a confection comprising the caramel as a filling and a crisp component is provided. The caramel filling comprises a solid plant fat and an amount of water less than 10 wt %, or from 0.1 wt. % to 5 wt. %, or from 0.5 wt. % to 4 wt. % water. The solid plant fat may have a Mettler Drop Point melting point of from 35° C. to 50° C., or from 40° C. to 45° C. Desirably, the caramel filing comprises from 8 wt. % to 20 wt. %, or from 10 wt. % to 18 wt. %, or from 12 wt. % to 16 wt. % of the solid plant fat. Even though, in some embodiments, the caramel does not comprise a liquid fat, the caramel exhibits an extrusion force of from 3500 gm to 8000 gm, or from 4000 gm to 7500 gm at 35° C.

Also due at least in part to the low moisture content of the caramel, a barrier layer is not required between the crisp component and the caramel, as is conventional, although a barrier may be used in embodiments wherein an extended shelf life is anticipated. If a barrier layer is utilized, it may comprise hydrogenated fat, crème, whey protein, ethyl cellulose, pullulan, or a combination of these and will desirably comprise an amount of water less than the caramel filling.

A coating may surround the confection, and in such embodiments, the coating may desirably comprise a fat based confection such as milk chocolate, dark chocolate, white chocolate, compound coating, or a combination of these. The crisp component may comprise cereal, nut meats, a biscuit, a cracker, a wafer, or a combination of these.

In some embodiments, the confection may have a shape that is not rectangular or square. In such embodiments, the properties of the caramel, as provided at least in part by the moisture content and solid plant fat, are beneficial in the manufacture of the confection. And so, in another aspect, a method of making a confection is provided.

The method comprises depositing a first portion of a coating, depositing a caramel filling having an amount of water less than 10% onto the deposited coating and placing a crisp component overlying the caramel filling. A second portion of the coating is then deposited, so that the coating substantially encompasses the confection. The first and second portions of the coating may be the same, or different, materials. The first portion of the coating may be deposited into a mold. The caramel may desirably be deposited using a chip depositor, a removable depositor, a point depositor, a one-shot depositor, a ribbon depositor, a drop depositor, a cluster depositor, or a combination of these.

The crisp component may be dispensed from a magazine stack, and in such embodiments, the method may further comprise loading the crisp component into a magazine stack prior to placing the crisp component. Once placed, the crisp component may be tamped and some embodiments of the method contemplate the same. A detection step may also be employed to ensure that the confection comprises the crisp component, and if no crisp component is detected, the confection may be ejected from the manufacturing stream.

In some embodiments, a barrier layer may be deposited onto the caramel filling prior to placing the crisp component, and may be deposited by a chip depositor, a removable depositor, a point depositor, a one-shot depositor, a ribbon depositor, a drop depositor, a cluster depositor, a sprayer, or a combinations of these.

DETAILED DESCRIPTION

Figure 1A:
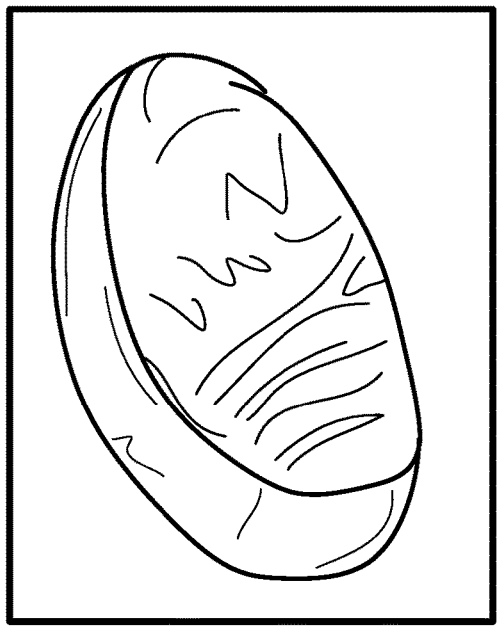
FIG. 1A is a photograph of a confection according to one embodiment.

The present specification provides certain definitions and methods to better define the present invention and to guide those of ordinary skill in the art in the practice of the present invention. Provision, or lack of the provision, of a definition for a particular term or phrase is not meant to imply any particular importance, or lack thereof. Rather, and unless otherwise noted, terms are to be understood according to conventional usage by those of ordinary skill in the relevant art.

The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation.

If ranges are disclosed, the endpoints of all ranges directed to the same component or property are inclusive and independently combinable (e.g., ranges of "up to 25 wt. %, or, more specifically, 5 wt. % to 20 wt. %," is inclusive of the endpoints and all intermediate values of the ranges of "5 wt. % to 25 wt. %," etc.).

Reference throughout the specification to "one embodiment" or "an embodiment" means that a particular feature, structure, or characteristic described in connection with an embodiment is included in at least one embodiment. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The present invention contemplates the possibility of omitting any components or steps listed herein. The present invention further contemplates the omission of any components or steps even though they are not expressly named as included or excluded from the invention.

As used herein, the phrase "solid plant fat" means a fat derived from a plant source that is solid at ambient temperature. On the other hand, the phrase "liquid plant fat" means a fat derived from a plant source that is liquid at ambient temperature. A Mettler Drop Point is the melt point of a material as measured using a Mettler Toledo "Drop Point" Instrument which specifically is designed to observe the point at which the material begins to flow as a liquid drop out the bottom of a small hole.

A caramel is provided that comprises a solid plant fat and an amount of water less than 10 wt. % based upon the total weight of the caramel. In some embodiments, the caramel does not comprise a liquid fat. Because of the presence of these two components, as well as the absence of the other, the caramel is processable, i.e., exhibits an extrusion force of from 3500-8000 gm at 35° C., and yet, exhibits a desirably chewy texture when consumed.

Measures of the chewiness of a confection include sensory attribute metrics such as those measured using quantitative descriptive analysis techniques. Taste and texture attributes can be reliably and reproducibly measured using sensory analysis methods known as descriptive analysis techniques. The Spectrum™ method of descriptive analysis is described in MORTEN MEILGAARD, D. Sc. ET AL., SENSORY EVALUATION TECHNIQUES (3d ed. 1999). The Spectrum™ method is a custom design approach meaning that the highly trained panelists who generate the data also develop the terminology to measure the attributes of interest. Further, the method uses intensity scales created to capture the intensity differences being investigated. These intensity scales are anchored to a set of well-chosen references. Using these references helps make the data universally understandable and usable over time. This ability to reproduce the results at another time and with another panel makes the data potentially more valuable than analytical techniques which offer similar reproducibility but lack the ability to fully capture the integrated sensory experiences as perceived by humans.

One descriptive analysis attribute is the Hard Overall Molars metric which quantifies the bite hardness, Adhesive which quantifies the stickiness of the caramel on the teeth, and Residual which quantifies the amount of caramel remaining on the teeth after consumption. The Hard Overall Molars attribute can also be useful in identifying which caramels will perform well in multi-region confections with a crisp component because Hard Overall Molars correlates to the attribute Contrast of Chew in the multi-region confection. Contrast of Chew helps identify compositions that deliver consumers' expectations for a desirable multi-region confection with a crisp component and a caramel which has a good combination of tastes and textures.

In some embodiments, a multi-region confection with a crisp component and a caramel with desirable chewiness has a Hard Overall Molars rating of from about 3.5 to about 4.5 on a scale of 0 to 15 as measured by quantitative descriptive analysis while in other embodiments, the multi-region confection has a Hard Overall Molars rating of from about 3.8 to about 4.2.

One measure of processability is the extrusion force necessary to deposit the caramel. Extrusion force, in turn, can be measured using any forward extrusion cell, such as those available under the trade designation TA.HDPlus commercially available from Texture Technologies Corp. (Scarsdale, N.Y.) using the associated methodology. Such units measure the compression force required for a piston disc to extrude a product through a standard size outlet of 3, 5, 7 or 10 mm. As so measured, the present caramel desirably exhibits an extrusion force of from 3500-8000 gm, or from 4000-7500 at 35° C. through a 10 mm outlet.

Any plant fat that is solid at ambient temperature may lend itself for use in the preparation of the caramel, although in order to achieve the desired processability while yet providing the finished caramel with a desirable chewy texture, the fat will desirably have a Mettler Drop Point melting point of from 35° C. to 50° C., or from 40° C. to 45° C. Suitable solid plant fats may also desirably have a solids content of from 70% to 80% at 10° C., from 50% to 60% at 20° C., from 30% to 40% at 25° C., from 15% to 25% at 30° C. and 8% to 15% at 35° C., less than 8% at 40° C., one of these, all of these or a combination of two or more of these. In some embodiments, the solid plant fat may have a solids content of from 72% to 76% at 10° C., 53% to 57% at 20° C., 33% to 38% at 25° C., 18% to 22% at 30° C., 9% to 14% at 35° C., less than 8% at 40° C., any one of these, a combination of any number of these, or all of these.

The solid plant fat may also desirably have an iodine value of from 35 to 50, or from 40 to 45 and in some embodiments, may have less than 1.0 wt % trans fat and/or less than 0.1 g moisture. And, in some embodiments, the caramel may have a ratio of carbohydrate to protein of from about 35:1 to about 45:1. In such, or other, embodiments, the caramel may have a protein content of from about 1.5% to about 2.5 wt. % based upon the total weight of the caramel.

Examples of suitable plant fats meeting, or capable of meeting, one or more of the above criteria include, but are not limited to, palm kernel oil or fat, cocoa butter, and combinations of these. Some examples of commercially available solid fats fitting one or more of the above criteria include a fat available from Loders Croklaan (Channahon, Ill.) under the tradename Freedom 300 G5, a fat available from Cargill (Minneapolis, Minn.) under the trade designation 56708, and fats available from Fuji Vegetable Oil, Inc. (White Plains N.Y.) under the tradenames Parkid-MNT and Parkid LS43-E.

The amount of solid plant fat to be used in the caramel will depend on the particular fat chosen as well as the overall composition. Generally speaking, amounts of solid plant fat from 8 wt. % to 20 wt. %, or from 10 wt % to 18 wt %, or from about 12 wt % to about 16 wt %, based upon the total weight of the caramel, are suitable.

The caramel may also desirably include a corn syrup blend comprising 43 DE (dextrose equivalent) and 63 DE corn syrup. Desirably, the ratio of these in the blend will be from 40:60 to about 60:40 43 DE:63 DE corn syrup. It has now been surprisingly found that the solid plant fat/corn syrup combination contributes to proper browning of the caramel while still allowing ready deposition. A caramel comprising this combination also exhibits the proper "stand up" property beneficial when the caramel is intended for use in a multi-layered confection.

Browning of the caramel can be further enhanced by adding an amount of a monosaccharide, and the same is contemplated in some embodiments. Any monosaccharide is suitable, and examples of these include dextrose, fructose, galactose, polymeric forms of these, anhydrous forms of these, hydrates of these, or combinations of these. In some embodiments, the monosaccharide comprises dextrose. As with the solid plant fat, the amount of monosaccharide will depend, at least on part, on the particular monosaccharide chosen. Generally speaking, amounts of from 2 wt % to 5 wt % are suitable.

The water activity of the caramel may desirably range from 0.3-0.5. The water activity of the caramel is desirably low so that water migration from the caramel to any other components of a confection in which the caramel may be used, is minimized. While moisture content of the caramel can be a factor in the overall water activity thereof, it is not the only factor and solely determinative of the same. For example, one or more polyols may be included the caramel, and if included, may impact the water activity of the caramel. Many polyols are known to those of ordinary skill in the art and any of these may be included in the caramel. Suitable examples include, but are not limited to, sorbitol, glycerin, hydrogenated starch hydrolysates, hydrogenated isomaltose, maltitol, mannitol, xylitol, erythritol, or a combination of these. In some embodiments wherein the caramel includes a polyol, the polyol may desirably comprise glycerin.

As with the other components, the amount of the polyol used will depend upon the particular polyol utilized, and the desired impact, if any, on the water activity of the caramel. Generally speaking, suitable amounts of any polyol to be included in the caramel will range from 3 wt % to 8 wt % based upon the total weight of the caramel.

The caramel may also comprise liquid invert sugar and sweetened condensed milk.

Several exemplary compositions of the caramel are shown in the table, below:

| Ingredient | % by weight | % by weight | % by weight |
|---|---|---|---|
| Liquid Invert Sugar with 77% Solids | 25-45 | 30-40 | 32-37 |
| Sweetened Condensed Milk | 10-30 | 15-25 | 17-22 |
| Solid vegetable fat | 8-20 | 10-18 | 12-16 |
| Corn Syrup 63 DE | 6-15 | 7-12 | 8-11 |
| Corn Syrup 43 DE | 6-15 | 7-12 | 8-11 |
| Glycerin | 1-10 | 3-9 | 4-8 |
| Dextrose Monohydrate | 0.5-8 | 2-5 | 2.5-4.5 |
| Water | 0.1-5 | 0.5-4 | 1-3 |

The caramel may be prepared according to any known method. In general, the process entails mixing ingredients comprising liquid ingredients in a heating vessel; heating the ingredients to form a uniform heated mixture while scraping the vessel during heating to prevent scorching; and increasing the heat to boil the ingredients to a temperature and for a time to achieve caramelization.

In one exemplary embodiment, the caramel may be formulated by mixing the ingredients together and heating slowly until the ingredients are thoroughly dissolved and mixed. Heating is continued with mixing until a temperature of about 118° C., 121° C. or 128° C. is reached, for soft, medium and hard caramels, respectively. The caramel may then be deposited, and cooled.

In another exemplary embodiment, the caramel may be prepared by weighing all ingredients and adding them to a suitable heating vessel, such as a heated, stirred kettle. The ingredients are mixed together and warmed to about 150° F. to 160° F. over low heat. The heating is continued with mixing and scraping for a suitable period of time to dissolve the sugar and emulsify the fat while maintaining the temperature at 150° F. to 160° F. (65° C. to 72° C.), typically from 5 to 30 minutes. Once the consistency and temperature of the mixture of ingredients is uniform, the heat is increased to a boil and slowly boiled, to a suitable temperature, e.g., about 235° F. (112° C.). The caramel is then boiled to develop sufficient caramelization (continue mixing and scraping) for from about 10 to about 15 minutes. The resulting cooked and caramelized caramel is then ready for further processing, such as depositing into the molded shell. The caramel may also be cooled, held and reheated as necessary for later use.

Because of the advantageous properties of the caramel, e.g., its processability and low moisture content and/or water activity, the provided caramel is advantageously employed in confections, and in particular, confections comprising a crisp component. And so, such confections are also provided.

Conventional high moisture confections, such as caramel, can lose moisture to crisp components so that when moisture equilibrium is attained, the confection has hardened the crisp components have lost some of their crisp texture. In contrast, the caramel of this invention starts at a water activity level closer, or equal, to that of many crisp components. Therefore, little or no moisture may migrate between the caramel and the crisp component(s), and little, or no, changes may take place in the texture of either. In some embodiments, the rate at which moisture migration and texture deterioration take place can be slower than conventional confections having a high moisture component and crisp component. There may also be significantly lesser tendency for the confection filling to dry out upon storage, which can lead to longer shelf life. The confection filling of this invention may also exhibit reduced reaction rates for such deleterious food reactions as non-enzymatic browning, which lead to off colors and flavors; lipid oxidation, which causes rancidity in fat containing ingredients such as peanuts and nutmeats; water-soluble nutrient degradation and most enzymatic reactions.

The confection comprises a caramel having a solid vegetable fat and an amount of water less than 10 wt % (based upon the total weight of the caramel) and a crisp component. Suitable amounts of the caramel, for example, are from 20 wt % to 50 wt %, or from 25 wt % to 45 wt %, or from 30 wt % to 40 wt %, based on the total weight of the confection.

The crisp component may be any typically used in a food item, and confections in particular. Suitable examples include, but are not limited to, puffed or toasted grain (cereals), biscuits, cookies, crackers, wafers, or a combination of these. Suitable percentages of the crisp component range from 20 wt % to 50 wt %, or from 25 wt % to 45 wt %, or from 30 wt % to 40 wt %, based upon the total weight of the confection.

In some embodiments, a barrier layer may be employed to further limit, or eliminate, moisture migration between the caramel and the crisp component and/or to assist in the maintenance of the textural properties of either or both. However, it is a particular advantage in at least some embodiments that, due to the advantageous properties of the caramel, a barrier layer may not be required.

In those embodiments where a barrier composition is utilized, any suitable barrier composition typically used in the art of confectionary manufacture may be employed. Suitable barrier compositions may desirably have a moisture content less than that of the caramel. For example, in some embodiments, any barrier composition utilized will desirably have a moisture content of from 0.1 wt % to 1.5 wt %, or from 0.2 wt % to 1.25 wt. %, or from 0.3 wt % to 1.0 wt %, based upon the total weight of the barrier composition. Examples of barrier compositions include, but are not limited to, fat, hydrogenated fat, crè, whey protein, ethyl cellulose, pullulan, or a combination of these. Suitable amounts of the barrier layer, if any, range from 0.1 wt % to 15 wt %, or from 0.5 wt % to 10 wt %, or from 1.0 wt % to 5 wt %, based upon the total weight of the confection.

The confection may desirably include a coating that substantially surrounds the caramel and crisp component, i.e., the coating may take the form of a shell surrounding the confection. The coating may be made of any fat-based confection suitable for encasing a confection. Examples of these include dark, milk, or while chocolate, or compound coating. In other embodiments, the coating may be derived from sugar with or without milk derived products, and include fat and solids from vegetable or cocoa sources in differing proportions. The coating may also comprise a chocolate substitute containing direct cocoa butter replacements, stearines, coconut oil, palm oil, butter or any mixture thereof. Nut pastes such as peanut butter and fat, praline, compounds or couvertures, may also be used for the coating of the confection. Suitable amounts of the coating may range from 20 wt. % to 50 wt. %, or from 30 wt. % to 50 wt. %, or from 35 wt. % to 50 wt. %, based upon the total weight of the confection.

Several exemplary compositions of the confection are shown in the table, below, wherein the indicated weight percentages are based upon the total weight of the confection:

| Ingredient | % by weight | % by weight | % by weight |
|---|---|---|---|
| Caramel | 20-50 | 25-45 | 30-40 |
| Crisp component | 20-50 | 25-45 | 30-40 |
| Barrier layer | 0.1-15 | 0.2-10 | 0.3-5 |
| Coating | 20-50 | 30-50 | 35-50 |

The term "chocolate", as used herein, refers to a solid or semi-plastic food and is intended to refer to all chocolate or chocolate-like compositions containing a fat-based component phase or fat-like composition. The term is intended to include standardized or nonstandardized compositions conforming to the U.S. Standards Of Identity (SOI), CODEX Alimentarius and/or other international standards and compositions not conforming to the U.S. Standards Of Identity or other international standards. The term includes dark chocolate, baking chocolate, sweet chocolate, bittersweet or semisweet chocolate, milk chocolate, buttermilk chocolate, skim milk chocolate, mixed dairy product chocolate, white chocolate, sweet cocoa and vegetable fat coating, sweet chocolate and vegetable fat coating, milk chocolate and vegetable fat coating, vegetable fat based coating, pastels including white chocolate or coating made with cocoa butter or vegetable fat or a combination of these, nutritionally modified chocolate-like compositions (chocolates or coatings made with reduced calorie ingredients) and low fat chocolates, aerated chocolates, compound coatings, nonstandardized chocolates and chocolate-like compositions, unless specifically identified otherwise.

In the United States, chocolate is subject to a standard of identity established by the U.S. Food and Drug Administration (FDA) under the Federal Food, Drug and Cosmetic Act. Definitions and standards for the various types of chocolate are well established in the U.S. Nonstandardized chocolates are those chocolates which have compositions that fall outside the specified ranges of the standardized chocolates.

For example, nonstandardized chocolates result when, for example, the nutritive carbohydrate sweetener is replaced partially or completely; or when the cocoa butter, cocoa butter alternative, cocoa butter equivalent, cocoa butter extender, cocoa butter replacer, cocoa butter substitute or milk fat are replaced partially or completely; or when components that have flavors that imitate milk, butter or chocolate are added or other additions or deletions in formula are made outside the FDA standards of identify of chocolate or combinations thereof. Chocolate-like compositions are those fat-based compositions that can be used as substitutes for chocolate in applications such as panning, molding, or enrobing; for example, carob.

In those embodiments wherein the coating comprises chocolate, the chocolate may typically contain a nutritive carbohydrate sweetener and/or one or more sugar substitutes. Nutritive carbohydrate sweeteners with varying degrees of sweetness intensity may be any of those typically used in the art and include, but are not limited to, sucrose, e.g. from cane or beet, dextrose, fructose, lactose, maltose, glucose syrup solids, corn syrup solids, invert sugar, hydrolyzed lactose, honey, maple sugar, brown sugar, molasses and the like. The term "sugar substitute" includes bulking agents, sugar alcohols (polyols such as glycerol), or high potency sweeteners or combinations thereof. Sugar substitutes may partially replace the nutritive carbohydrate sweetener. High potency sweeteners include aspartame, cyclamates, saccharin, acesulfame-K, neohesperidin dihydrochalcone, sucralose, alitame, stevia sweeteners, glycyrrhizin, thaumatin and the like and mixtures thereof. Examples of sugar alcohols may be any of those typically used in the art and include sorbitol, mannitol, xylitol, maltitol, isomalt, lactitol and the like.

Chocolate may also contain bulking agents. The term "bulking agents" as defined herein may be any of those typically used in the art and include polydextrose, cellulose and its derivatives, maltodextrin, gum arabic, and the like.

Emulsifiers are also typically included in chocolate. Examples of suitable emulsifiers may be any of those typically used in the art and include lecithin derived from vegetable sources such as soybean, safflower, corn, etc., fractionated lecithins enriched in either phosphatidyl choline or phosphatidyl ethanolamine, or both, mono- and digylcerides, diacetyl tartaric acid esters of mono- and diglycerides (also referred to as DATEM), monosodium phosphate derivatives of mono- and diglycerides of edible fats or oils, sorbitan monostearate, hydroxylated lecithin, lactylated fatty acid esters of glycerol and propylene glycol, polyglycerol esters of fatty acids, propylene glycol mono- and di-esters of fats and fatty acids, or emulsifiers that may become approved for the US FDA-defined soft candy category. Other emulsifiers that can be used include polyglycerol polyricinoleate (PGPR), ammonium salts of phosphatidic acid, sucrose esters, oat extract, etc., any emulsifier found to be suitable in chocolate or similar fat/solid system.

One particular exemplary formulation of a dark chocolate suitable for use as the coating may include 43.6% w/w sucrose, 43.6% w/w cocoa mass, 12.3% w/w cocoa butter, and 0.5% w/w lecithin. The ingredients of the dark chocolate are mixed in either a continuous or batch system until thoroughly blended and then refined until a desired consistency and particle size are reached. The refined mass is then further agitated in a conch. Lastly, the dark chocolate may then be deposited to form the first and/or second coating portion.

An exemplary formulation of a sugar free chocolate suitable for use as the coating might include 43.6 w/w % crystalline maltitol, 43.6% w/w cocoa mass, 12.3% w/w cocoa butter, and 0.5% w/w lecithin. The ingredients of the sugar free chocolate are mixed in either a continuous or batch system until thoroughly blended and then refined until a desired consistency and particle size are reached. The refined mass is then further agitated in a conch. The sugar free chocolate may then be deposited to form the first and/or second coating portion.

An exemplary formulation of a milk chocolate suitable for use as the coating may include a milk crumb comprising 13.5 w/w % cocoa liquor, 53.5% w/w sugar, and 32.0% w/w milk solids. One suitable formulation process may involve kneading the milk solids and sugar together with the cocoa liquor such that controlled crystallization can occur. The crumb is then dried to the desired final moisture content. Drying can involve vacuum drying alone or drying can occur in combination with drum driers. 84.4 w/w % of the milk crumb is then combined with 15% w/w cocoa butter, 05% w/w lecithin, and 0.1% w/w flavor. These ingredients are then mixed in either a continuous or batch system until thoroughly blended and then refined until a desired consistency and particle size are reached. The refined mass is then further agitated in a conch. The milk chocolate may then be deposited to form the first and/or second coating portion.

In some embodiments, the confection may include one or more confectionary fillings in addition to the caramel. Examples of materials suitable for use as the at least one other filling include, but are not limited to, fudge, nougat, candy floss (also known as cotton candy), ganache, meringue, marzipan, hard boiled candy, toffees, butterscotch, nut brittles or croquant, pralines or nougats, truffles, fourres, nut pastes, nut butters including peanut butter, coconut paste, crème paste, licorice paste, chocolate spreads, chocolate crumb, nut butter, taffy, crè, nougat, mousse, nut butter, nut crè, fruit fillings, fondant including fondant-based crès, frappe, fruit juice; vegetable juice; fruit puree; fruit pulp; vegetable pulp; vegetable puree; fruit sauce; vegetable sauce; honey; maple syrup; molasses; corn syrup; sugar syrup; liqueurs; chocolate syrup, dairy-based liquids such as milk, cream, or a combination of any number of these.

One particular exemplary formulation for a fudge suitable for use as an additional confectionary filling may include, 41.36% w/w sweetened condensed milk, 11.69% w/w butter, 19.65% w/w granulated sugar, 25.85% w/w semisweet chocolate, 1.03% w/w glucose syrup and 0.42% w/w vanilla. The fudge could be formulated by combining the sweetened condensed milk, sugar and butter in a steam jacketed kettle and heated with stirring until the temperature reaches 150° F. The vanilla may be added during mixing. Heating continues until the mass reaches a temperature of about 238° F. at which point the steam is turned off and the chocolate is added with vigorous stirring. Next, the glucose syrup is added with stirring. The mass is cooled with stirring until it reaches a temperature of 180-190° F. The fudge may then be deposited before, after, or with the caramel.

One particular exemplary formulation of a nougat suitable for use as an additional filling might include 0.37% w/w egg albumen, 3.13% w/w water, 6.59% w/w sugar, 2.00% w/w water, 36.63% w/w sugar 36.63% w/w glucose syrup and 14.65% w/w water. The nougat may be prepared by dissolving the egg albumen in the 3.13 wt. % water while the 6.59% sugar is dissolved in the 2.00% water. The egg albumen and sugar solution are then mixed together and aerated. In a separate vessel, the 36.63% sugar is dissolved in the 14.65% water and the glucose syrup is added with mixing. This sugar solution is then boiled to 141° C. The boiled sugar solution is then added to the whipped egg albumen/sugar solution in a thin stream. The nougat may then be deposited before, after, or with the caramel.

One exemplary formulation of a fondant suitable for use as an additional filling may include 60% w/w sugar, 15% w/w glucose syrup, and 25% w/w water. The fondant may be formulation by dissolving the sugar and glucose syrup in water. The solution is boiled until it reaches 117° C. or about 88% solids. The evaporated syrup is then agitated while cooling to induce rapid crystallization. The fondant may then be deposited before, after, or with the caramel.

A crè suitable for use as an additional filling may also be prepared using the fondant, and one or more other confectionary compositions. For example, one suitable crè may include from 75% to about 95% w/w fondant and from about 5% to about 25% w/w of a frappe. Suitable frappes may include, for example, 1.64% w/w egg albumen, 3.10% w/w water, 32.87% w/w sugar, 46.10% w/w glucose syrup and 16.29% w/w water. The frappe could be prepared by mixing the egg albumen and 3.10% water and allowing the mixture to stand at 40° F. for 24 hours. Meanwhile, the sugar, glucose syrup and 16.29% water are dissolved together and boiled until they reach 225° F. The sugar syrup is then cooled to 140° F. and the egg albumen solution is whisked into the cooled sugar syrup. Whipping desirably continues until a density of 0.35 to 0.5 is reached. The crè is then prepared by remelting the fondant with gentle mixing while folding in the frappe. The temperature is increased to 140° F. and flavors, colors, etc. can be added. The crè may then be deposited before, after, or with the caramel.

In addition to the crisp component, the confection may also contain particulates, known as inclusions in the art, either incorporated into any of the components thereof, or as garnishes on the finished confection. Indeed, in embodiments wherein inclusions are included in confection, the advantageous properties of the caramel may act to reduce or eliminate moisture migration from the caramel to the inclusions, so that the textural integrity of each is substantially maintained. Those of ordinary skill in the art are well aware of the many inclusions that may desirably be included in confections and any of these may be used. Examples of suitable particulates include, but are not limited to, fruit, including crystallized, lyophilized or dried fruit, nuts, coconut, crisped rice or other grains or seeds, cocoa beans; coffee beans; milk powders; freeze dried fruit; freeze dried vegetables; fat particles; cocoa powder; sucrose; starch; polyols such as xylitol, erythritol, sorbitol, mannitol, maltitol, isomalt, hydrogenated starch hydrosylates; waxes or combinations of any number of these.

Due at least in part to the low moisture content and the properties of the solid plant fat, the caramel is readily deposited during manufacture, and yet exhibits the desired organoleptic properties upon consumption. And so, a process for providing the confections is also provided. The process comprising depositing a first portion of a coating, depositing the caramel, placing a crisp component and depositing a second portion of the coating, be it the same, or a different, material than the first portion.

In other words, the present confection is manufactured by inverting the structure of the confection and building it "upside down", i.e., the opposite orientation of the intended orientation during consumption. Making the confection in this way allows for the production of more intricate shapes, i.e., shapes other than squares or rectangles, than are possible with enrobing techniques. The present invention therefore provides advancement over the existing art in allowing confectioners to provide shapes having great detail.

The first portion of the coating is placed or deposited into a mold to form at least a portion of the exterior of the confection. The coating maybe tempered prior to placement in the mold. Since the coating, or shell, may be molded, the method provides a unique opportunity to create a multi-region confection whereby the shell may be formed into more complex shapes than can be accomplished via enrobing techniques.

The coating portions may be deposited by any known method, e.g., by cold stamping, frozen shell, one-shot molding, and combinations thereof. Suitable devices for depositing the coating into a mold include those commercially available from Carle & Montanari-OPM located in Rozzano, Italy. In some exemplary embodiments, the fast shell processing equipment available from Carle & Montanari may be used to deposit the coating.

The caramel is then deposited into the upside down shell provided by the deposited coating. At least due to the inclusion of the solid plant fat and an amount of water less than 10 wt %, the caramel is readily processable/depositable, i.e., the caramel may advantageously exhibit an extrusion force of from 3500-8000 gm at 35° C., or from 4000-7500 gm at 35° C. And so, the caramel is advantageously deposited using any known piece of equipment capable of applying such force. These include but are not limited to chip depositor, a removable depositor, a point depositor, a one-shot depositor, a ribbon depositor, a drop depositor, a cluster depositor, or combinations thereof.

An amount of one or more barrier layers may be deposited after the caramel, although it is a particular advantage of some embodiments of the caramel and confection that a barrier layer is not necessary. In embodiments where a barrier layer is used, it may be deposited using any known deposition technique or equipment, e.g., chip depositor, removable depositor, point depositor, one-shot depositor, ribbon depositor, drop depositor, or cluster depositor to name a few. In some embodiments wherein a barrier composition is to be included, it may be applied via spraying. The use of spraying to apply any barrier layer allows for substantially complete coverage with a thin layer of the barrier material.

A crisp component may then be placed within the confection. Again, due at least in part to the advantageous properties of the caramel, and in particular to the low water content and/or water activity of the same, placing the crisp component so that it is in contact with the caramel advantageously does not result in the substantial degradation of the textural properties of either, whether a barrier layer is used, or not. Examples of crisp foods useful in creating the crisp component of the confection include but are not limited to puffed grains such as cereal. Such grains may include wheat, rice, and soy. Puffed corn kernels may also be used as well as nut meats. Other crisp foodstuffs may be used to create the crisp component such as cookies, wafers, crackers and/or biscuits. It is to be appreciated that any or all of these crisp foods may be combined in a single crisp layer or may be layered alternating with the caramel or any other fillings to be utilized in the confection.

Because the method assembles the confection "upside down" more complex shapes may be produced than enrobing techniques are capable of producing. The crisp component may thus have any shape, but in particularly advantageous embodiments, may have a complex shape, i.e., a shape other than a square or rectangle. Using the present method, any shape is possible, and nonlimiting examples of the same include human shapes, geometric shapes (other than squares or rectangles), animal shapes, plant shapes, cartoon shapes, shapes associate with the weather, shapes associated with holidays, etc.

Examples of human shapes include boy, girl, ballerina, soldier, while examples of geometric shapes include circles, ovals, rings, ellipses, trapezoids, triangles or pyramids, and diamonds. Animal shapes, for example, include, dogs, cats, birds, rabbits, fish, horse, cow, pig, sheep, lizards, snakes, while plant shapes include, e.g., trees, leaves, fruits, vegetables or flowers. Shapes associated with the weather include the sun, clouds, and lightning bolts, while examples of shapes associated with holidays include stars, flags, hearts, sleighs, wreaths, pumpkins, reindeer, turkeys, Easter eggs, Easter bunny, Easter basket, Christmas trees, Santa Claus, Mrs. Claus, or cupid, to name a few.

Figure 1B:
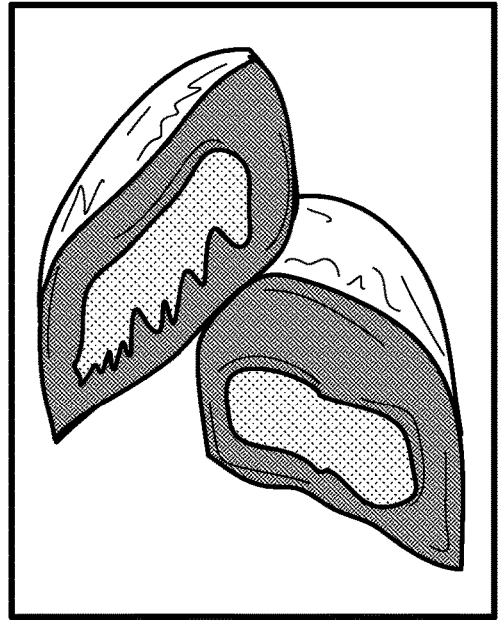
FIG. 1B is a photograph of the confection shown in FIG. 1A, taken in cross section.
Figure 2:
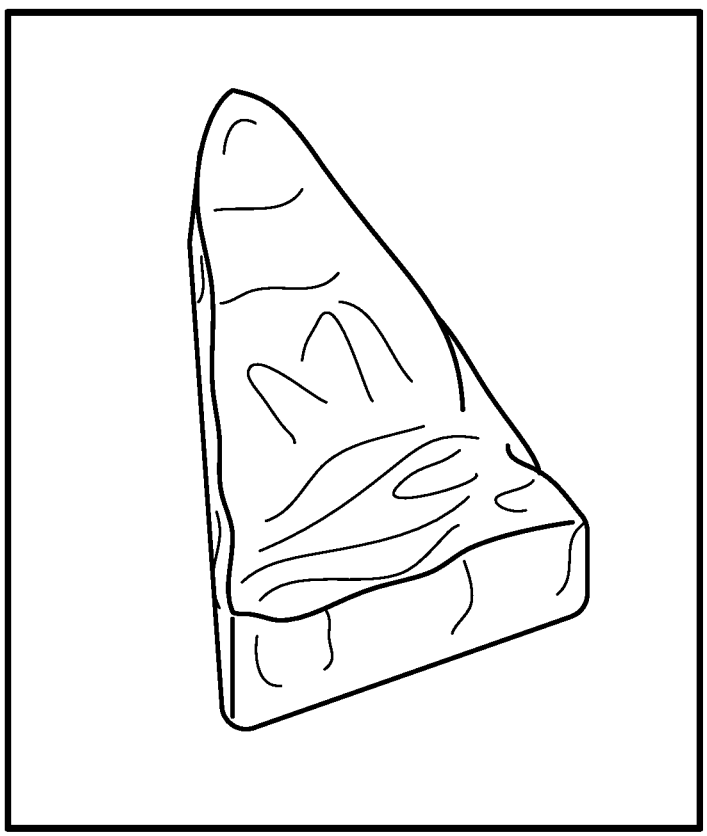
FIG. 2 is a photograph of a confection according to another embodiment.

One embodiment of a confection is shown in FIG. 1A, wherein the confection has the shape of an oval, or egg. The confection shown in FIG. 1A is shown in cross section in FIG. 1B, wherein the crisp component, caramel and coating can be seen. FIG. 2 shows a confection according to another embodiment, wherein the confection is in the shape of a pine, or Christmas, tree.

In some embodiments the crisp component may substantially cover the opening of the inverted coating or shell. Placing such a large object into/onto a relatively fragile coating or shell is challenging, and requires exceptional precision to avoid damaging the coating. Even if improper placement of the crisp component does not break or crack the coating, it may protrude beyond the boundary the coating and detrimentally affect the visual impact of the shaped coating. Depositors like those commercially available from the Realfeed Division of RM Technology Engineering located in Crema, Italy are useful for placing the crisp component.

The crisp component may be tamped following the placing step. In some embodiments, the crisp component may be loaded into a magazine stack before placement. The method also contemplates the use of a device for detecting whether or not the crisp component was correctly placed. In such embodiments, if the detection device determines that a crisp component was not placed, or was placed incorrectly, the confection may be rejected by ejecting it from the processing line.

A second portion of the coating is then deposited to substantially enclose the crisp component and caramel to complete the confection, and may be deposited in the same, or a different, fashion as the first portion. And, the first and second coating portions may comprise the same, or different, materials.

If fillings in addition to the caramel are to be included in the confection, they may be provided in any desired arrangement relative to the first coating portion, caramel, crisp component and second coating portion.

It is to be appreciated that the confection may include any number of crisp components and any number of layers of caramel and/or other confectionary fillings. All that is required is that at least one layer of the caramel be in contact with at least one crisp component for at least some of the benefits described herein to be realized. For example, a layer of nut meats may be deposited into the first coating portion, followed by cereal and then the caramel could be added to the double layer of crisp components and the confection encompassed by the second coating portion. Or, an additional confectionary filling, e.g., a nougat or fudge, may be deposited into the first coating portion, followed by the caramel filling and a crisp component and enclosure of the confection via the second coating portion. As one can envision, any of the layers may be repeated any number of times, and numerous combinations and configurations are possible and within the scope of the invention.

Example 1 and 2

The following ingredients are mixed, by the procedure that follows, to form caramels according to a first and second embodiment, wherein the weight percentages provided are based upon the total weight of the mixture.

| Ingredient | Percent by weight | Percent by weight |
| --- | --- | --- |
| Liquid Invert Sugar with 77% Solids | 35 | 35.53 |
| Sweetened Condensed Milk | 19.43520 | 19.14 |
| High melting point fat | 13.46275 | 14.15 |
| Corn Syrup 63 DE | 9.84210 | 8.40 |
| Corn Syrup 43 DE | 9.84210 | 8.40 |
| Glycerin | 5.61436 | 5.65 |
| Dextrose Monohydrate | 3.50000 | 6.73 |
| Water | 2.00000 | 0.95 |
| Salt Fine | 0.70000 | 0.61 |
| Lecithin | 0.35000 | 0.35 |
| Flavor | 0.25350 | 0.02 |

The above ingredients were processed as follows: In one vessel, the water, fat, ½ of the lecithin, flavor, corn syrups and fat are heated together with mixing and cooked to 200° F. In another vessel, the invert sugar and dextrose are mixed and the heated sugar and fat blend is added with the combined mixtures being heated with mixing to 259° F. Then the sweetened condensed milk, ½ lecithin, and glycerin are mixed and then slowed added to the combined sugar and sugar fat mixtures. The total mixture is cooked to 252° F. with the sides of the kettle being constantly scraped to prevent scorching.

The resultant caramel had a water content of from about 5 to about 10 wt %, water activity of between about 0.3-0.5 and an extrusion force of from 3500-8000 gm at 35° C. More particularly, the extrusion force of the caramel was measured using a forward extrusion cell (commercially available under the tradename TA.HDPlus, from Texture Technologies Corp., Scarsdale, N.Y.) with 10 mm extrusion disc (HDP/FE) and 50 kg load cell, equipped with a heavy duty platform (HDP/90). The caramel sample and forward extrusion assembly are stored in a 35° C. over for 3 hours prior to analysis. Caramel is filled to the top of the extrusion cell. The cell is then allowed to equilibrate in the 35° C. oven for at least 30 minutes prior to testing.

The cell is removed from the oven just prior to testing. A forward extrusion container is positioned centrally under the probe, and the test commenced. The Settings of the extrusion force cell are as follows:

Mode: Measure Force in Compression
Option: Return to Start
Test Speed: 1.0 mm/s
Post-Test Speed: 10.0 mm/s
Distance: 70 mm
Trigger Type: Button When a 50 g surface trigger is attained the piston proceeds to push onto the sample. Once the piston makes contact with the caramel, the sample is being deformed and compressed to pack more and more tightly into the diminishing space available under the descending piston and the force is seen to increase gently. Soon afterwards when the sample becomes more packed, except for small amounts of entrapped air, the force is seen to increase steeply and the extrusion commences. Once the force increases to a maximum point a plateau is observed which shows the force required to continue extrusion. For some samples, a dramatic decrease can be seen when an air pocket is present in the sample. The force then returns to the plateau. The average force on the plateau is recorded as the extrusion force.

The invention claimed is:

1. A method of making a confection comprising caramel, a crisp component, and a coating, said method comprising:
depositing a caramel onto a first portion of a coating, wherein the caramel comprises a solid plant fat, an amount of water less than 10 wt. %, and one or more polyols in an amount of from 3 wt. % to 8 wt. % of the caramel, the solid plant fat having a solids content of from 8% to 15% at 35° C., the caramel having an extrusion force of from 3500-8000 gm at 35° C.;
placing a crisp component onto the deposited caramel; and
depositing a second portion of a coating onto the crisp component.

2. The method of claim 1, wherein the first and second coating portions comprise different materials.

3. The method of claim 1, wherein the first and second coating portions comprise the same material.

4. The method of claim 1, wherein the first portion of coating is deposited into a mold.

5. The method of claim 1, wherein the caramel is deposited using a chip depositor, a removable depositor, a point depositor, a one-shot depositor, a ribbon depositor, a drop depositor, a cluster depositor, or a combination thereof.

6. The method of claim 1, wherein the first portion of the coating has a melting point, and wherein the caramel is deposited at a temperature below the melting point of the first portion of the coating.

7. The method of claim 1, further comprising loading the crisp component into a magazine stack prior to placing the crisp component onto the deposited caramel, and further comprising tamping the crisp component.

8. The method of claim 1, wherein the confection is made in a manufacturing stream, and wherein the method further comprises determining whether the crisp component is detected after placement onto the deposited caramel, and further comprises ejecting the confection from the manufacturing stream if the crisp component is not detected.

9. The method of claim 1, further comprising depositing a barrier layer onto the caramel prior to placing the crisp component.

10. The method of claim 1, wherein the polyol is selected from the group consisting of sorbitol, glycerin, hydrogenated starch hydrolysates, hydrogenated isomaltose, maltitol, mannitol, xylitol, erythritol, and combinations thereof.

11. A method of making a caramel confection, the method comprising:
depositing, onto a surface, a caramel having an extrusion force of about 3500 to about 8000 gm at 35° C., the caramel comprising:
a solid plant fat having a solids content of from 8% to 15% at 35° C.;
an amount of water less than 10 wt. %; and
a polyol in an amount of from 3 wt. % to 8 wt. %; and
cooling the caramel.

12. The method of claim 11, wherein the caramel is deposited using a chip depositor, a removable depositor, a point depositor, a one-shot depositor, a ribbon depositor, a drop depositor, a cluster depositor, or combinations thereof.

13. The method of claim 11, wherein the caramel is deposited into a molded shell.

14. The method of claim 11, wherein the caramel is reheated after the cooling.

15. The method of claim 11, wherein the caramel has a protein content of from about 1.5 wt. % to about 2.5 wt. % of the caramel.

16. The method of claim 11, wherein the solid plant fat has a solids content of from 15% to 25% at 30° C.

17. The method of claim 11, wherein the polyol is selected from the group consisting of sorbitol, glycerin, hydrogenated starch hydrolysates, hydrogenated isomaltose, maltitol, mannitol, xylitol, erythritol, and combinations thereof.

18. The method of claim 11, wherein the solid plant fat has a Mettler Drop Point melting point of from about 35° C. to about 50° C.

19. The method of claim 11, wherein the caramel has a Hard Overall Molars rating of from about 3.5 to about 4.5 on a scale of 0 to 15.

* * * * *